UNITED STATES PATENT OFFICE 2,440,204

PROCESS OF DECOLORIZING GUM ROSIN

William Burns Logan, Lake Charles, La.

No Drawing. Application June 24, 1943,
Serial No. 492,131

1 Claim. (Cl. 260—108)

The present invention is a process of improving gum rosin, which product is well known to be, as regards its chemical and physical properties, and as to the nature and amount of impurities, substantially different from wood rosin. In speaking of "impurities" here, I refer to substances commonly present in the respective rosin, other than abietic acid and its anhydrides. These impurities include colored bodies which it is desired to remove in the present process, and which bodies may be rather different in the two kinds of rosin referred to, and hence a given treatment of one of these rosins may produce a good decolorization if applied to gum rosin and a poor decolorization if applied to wood rosin, or vice versa. I do not herein claim any treatment of wood rosin.

The present application is in part a continuation of my copending application Ser. No. 373,835, filed January 9, 1941, now abandoned.

My invention relates to a process for purifying gum rosin (colophony) by so improving its color, transparency and brilliancy as to enhance its usefulness and likewise its commercial value in many of the arts. A particular object of the invention is to accomplish said results without substantially increasing its tendency towards crystallization. As is well known from my prior researches, an increase in the tendency to crystallization in rosin, is definitely indicated by a lowering of the dextrototatory power of the rosin, and of course if any treatment of a rosin produces a laevo-rotatory product, the crystallizing properties of the treated product will be very greatly increased. As is well known, rosins which have an enhanced tendency to crystallize, are far less suitable, for certain of the common uses of the rosin (e. g., for paper sizing, soap making, paints, varnishes, inks, and core oils).

A further important object of the invention is to accomplish the improvements in gum rosin without altering, to any substantial extent, the normal composition (other than the elimination of the color bodies) and the ratio of the several resin acids normal to gum rosin and the "resenes." A further object is to greatly improve the color of the rosin (i. e., to eliminate much of the color present in the rosin) without destroying the natural American gum rosin fragrance.

Gum rosin as at present produced varies in color, ranging from very dark to extra pale. According to U. S. Government classification, the darkest colored gum rosin is practically black and is known in the trade as B, the lowest designated grade recognized in the trade as gum rosin is called D, then follow in order of decreasing color the grades designated as E, F, G, H, I, K, M, N, W. G., W. W., and X. As the color of the rosins appear lighter, so their commercial values increase. Gum rosin is made from the oleoresins secured by an appropriate scaring of living pine trees.

A large volume of rosins known as wood rosins are recognized and so designated by the U. S. Department of Agriculture and the purchasing public. Wood rosin is made from dead wood, largely old stumps left from lumbering operations. Wood rosins are, with the single exception of the grade FF, classified and traded in, upon the same standards as set up for gum rosins.

It has been the aim of the producers of both gum rosin and wood rosin to manufacture a product of as light color (and high commercial value) as is possible. Much thought, experimental work and money have been expended by the producers to this end, with progress made by both, particularly the wood rosin producers.

Of all the means known to me of the prior art, I recite the following:

(1) Sunlight bleaching of gum rosin (colophony); rosin is exposed to direct sunlight or artificially produced light, the rosin being naked or dissolved in a solvent, a practice followed only in Europe, especially with rosin from the *Pinus maritimus* of France.

While the color is thereby slightly improved, the improvement is not always permanent, for when the improved product is used in the arts the color may revert to the original and in some cases to darker than the original.

(2) Treating the gum or wood rosin in a solution in petroleum naphtha with strong sulphuric acid, then washing free from this acid and from polymers and/or dehydrated bodies or other undesirable reaction products, and recovering a paler product from the naphtha.

This often produces too great a shrinkage of finished product, from the original, also the resin acids become to a considerable extent isomerized, resulting in a product that crystallizes within its mass, and from all solvents that will dissolve it.

(3) Distillation in vacuo, with or without the use of a current of gas or vapor inert to rosin.

Generally this gives too low a yield of improved product, if much increase in grade is attained from the original and always with a decided increase in crystallizing properties as set out in (2) supra.

(4) The employment of differentiating solvents, i. e., where the gum rosin is dissolved in one solvent, then another immiscible solvent with a strong solution preference for the color bodies is employed to extract them from the common solvent.

This treatment usually requires elaborate equipment, exacting control of process and is relatively expensive, for results obtained, and no color grades higher than X were claimed.

(5) Color bodies of gum or wood rosin in petroleum solutions are caused to form lightly bound additive chemical compounds with anhydrous tetravalent metallic chloride (e. g., stannic chloride), which additive compounds are insoluble in the rosin solvent and from which the purified product is separated by either decantation or filtration, with subsequent solvent removal and reduction to the decolorized rosin.

This process is relatively expensive and the resultant product has extreme crystallizing properties.

(6) Adsorption of the color bodies from the gum rosin by contacting the rosin, in a highly fluid state produced by heating it to temperatures greatly in excess of its melting point with bentonite, meta-bentonite, fuller's earth or magnesium silicates, then filtering for the removal of the adsorption agents.

This process, where tried, has given too slight an improvement in the grade of product, perhaps due to poor opportunity for contact of the color bodies in the rosin with the adsorption agents, even when the rosin is heated to its incipient decomposition temperature, and always it gives a resultant product whose tendency to crystallize is so heightened as to unfit it for most of the uses to which rosin is put. The percentage of loss, in this process, is high.

Any and all of the above recited means of purifying gum rosin (colophony) give only variable and uncertain degrees of success as to the resultant product. None but the first have been employed commercially, because the expense has been found disproportionate to the financial returns attained for any improvement in product.

I am aware of R. E. Price Patent No. 2,181,791, on the treatment of wood rosin in solution, which does not disclose any treatment for removing the color content of gum rosin (colophony). This patent is restricted to the treatment of wood rosin, and calls attention to differences between the color bodies found in gum rosin and wood rosin, respectively.

My researches have disclosed that the color bodies of gum rosin (colophony) when said gum rosin is dissolved in a solvent that is relatively slightly adsorbed by the adsorbent (a light petroleum distillate, petroleum naphtha being such a solvent), yields quite readily to some of the commonly known adsorbing agents, such as fuller's earth, plain or acid treated, metabentonite, plain or acid activated, and most advantageously hydrous magnesium silicates, the latter being either synthetic, or referably, the naturally occurring hydrous magnesium silicates, and with such ease and to such extent as to make possible the simple and inexpensive commercial decolorizing of gum rosin. Thus an E—F or lower grade gum rosin can be decolorized by the magnesium silicate to give a grade very much lighter in color than X, or more nearly corresponding to, though still much lighter in color than the French grade (termed AAA) of highly purified gum rosin; is easily accomplished.

However, I have found that many (and I believe all) natural deposits of hydrous magnesium silicates contain amounts of aluminum silicates which cannot be separated from the principal constituent, hydrous magnesium silicates, by any commercially economic means and their presence in the natural essentially hydrous magnesium silicates renders this material unsuitable, under certain conditions, as an adsorbent for the color bodies of gum rosin on account of their adverse isomerizing effect upon the resin acids of gum rosin.

It is a proven fact (and generally known in the industry) that aluminum silicates exhibit this property towards rosin acids of gum rosin, in solutions, to a very pronounced degree, at normal temperatures and with increasing rate and extent at higher temperatures. Hence I do not use fuller's earth (or other forms of aluminum silicate) as a color adsorbent for decolorizing gum rosin solutions. One object of the present invention is to prevent any decrease in the optical rotation of the gum rosin.

By adverse isomerization of resin acids of rosins, I refer to the rearrangement of their molecular constitution such as to revert dextrorotatory acids to laevo-rotatory ones; the extent of this reversion can be nicely determined by polarimeter comparison of the specific optical rotation of the original rosin with that of the exposed or treated product produced.

As stated above, a reduction in the dextrorotatory power of the rosin is an index of the increasing crystallizing tendency of the rosin. Hence, I am to decolorize the gum rosin without any considerable reduction in dextro-rotatory power of the rosin started with.

It is also generally known that gum rosins with decreased dextro-rotatory power, and the laevorotatory gum rosins crystallize readily, either within themselves though much more readily from their solutions in any solvent; and it is to be expected, that easily crystallizable rosins would have a very limited demand and for most uses to which rosins are put in commerce, a strong crystallizing property would make such rosins useless.

It is furthermore generally known that aluminum silicates act as dessicants and are commercially exploited for the removal of moisture from both gases and liquids; this pronounced property of the aluminum silicates is not a pronounced property of the hydrous magnesium silicates; herein I find a means of rendering the aluminum silicates, present in a natural mineral consisting essentially of hydrous magnesium silicates, inactive both as an adsorbent as well as an isomerization agent when natural deposits of essentially hydrous magnesium silicates are to be used as an adsorbing material in decolorizing gum rosin solutions.

When wood rosins, in solution, are decolorized with a natural deposit of essentially hydrous magnesium silicates but containing some aluminum silicate, the conditions are not comparable to when gum rosins are so treated, since wood rosins contain 4% to 11% (averaging 8%) more neutral bodies (mostly resenes, resene-like bodies and esters), than do gum rosins and it is believed these neutral bodies act as protective colloids to shield the resin acids of wood rosins from the severe isomerization effects of the aluminum silicates; also wood rosin of FF grade contains nearly four times the weight quantity of color bodies as does E—F grade gum rosin; and it is known in patent and other literature that aluminum silicates are pronouncedly better color adsorbing agents than hydrous magnesium silicates; it is then natural to expect the aluminum silicates of the natural deposit of essentially hydrous silicates would be prompt to saturate themselves with the color bodies from a solution of wood rosin more so than the magnesium silicates and to such extent as they saturate themselves they likewise inactivate themselves as isomerization agents for the resin acids of the gum rosin. Howsoever it may be, it is claimed possible to decolorize a 20% by weight naphtha solution of wood rosins of FF color grade to wood rosin of X color grade within one hour's contact time at a temperature of 28° C., using a ratio of four parts by weight of magnesium silicates to one part by weight of rosin without lowering the specific optical rotation of the decolorized product more than from plus 17° to plus 16.5°.

I find, employing a natural deposit consisting essentially of hydrous magnesium silicates and having a substantial content of aluminum silicate, oven dried to 105° C., in the form of granules (e. g., passing 60 mesh and retained on 80 mesh screen), and a contact period of 3 hours and a temperature of 30° C., I can decolorize a 20% naphtha solution of E—F grade gum rosin to a color grade of X and with as little as 1 part by weight of this adsorbent to 1 part by weight of rosin. However the resin acids of the rosin will have suffered isomerization to the extent of lowering the specific optical rotation of the resultant decolorized rosin from plus 30°, polarimeter reading, to as low as minus 1.0°; using the crystallization indicator test suggested by Palkin and Smith, such so treated gum rosin would begin crystallizing from a solution of 75% by weight rosin and 25% by weight acetone, within 3–5 minutes and about 70% would crystallize within one week. With some of the other solvents, instead of acetone, the crystallization would be somewhat slower but definitely would occur.

I also find that if I moisture-condition some of the same lot and size of a natural deposit of essentially hydrous magnesium silicates with a similar aluminum silicate content, to the extent it will contain 8% to 9% of moisture, the same E—F grade gum rosin in 20% solution in naphtha when treated with this moisture conditioned adsorbent, in same ratio of adsorbent to rosin, at the same temperature and for the same time period I can produce a decolorized gum rosin of X color grade and having a specific optical rotation, within the limits of error of observation, the same as the original E—F gum rosin and whose tendency towards crystallization also will not have changed from the original, as demonstrated by observation tests of the same strength solutions of the original and decolorized product in acetone or other common industrial solvent, either of mineral, vegetable or animal source and mixtures of same. In the above statement, and elsewhere herein, (i. e., throughout the description and claims hereof) "20% solution," means one containing 20% by weight, i. e., 1 part by weight of rosin to 4 parts by weight of solvent.

I furthermore find that if I employ a part of the above same sized adsorbent that has been oven dried (105° C.) and under the above same conditions of contact time and temperature but increase the ratio of adsorbent to rosin to four to one, I can produce from the same lot of E—F gum rosin in 20% naphtha solution a gum rosin whose color grade was such as when five (5) cubes of the decolorized rosin were placed end on end and observed, the color corresponded with the same shade and depth of color, of one (1) U. S. Standard cube of X grade rosin, hence the decolorized product may be looked upon as "XXXXX" or "5 X" color grade, but this product inclined to crystallize within itself and would begin to crystallize from, immediately upon entering, solution in acetone (75% rosin, 25% by weight acetone) and within minutes from the time it was dissolved in other rosin solvents, at a strength of 40% or more by weight of rosin. The original E—F gum rosin of plus 30° specific optical rotation would be found to have been isomerized to the extent that the specific optical rotation had been decreased to minus 35°; such a rosin, for this very reason alone, would have very little value to commerce and the arts although it was practically without color, a much sought for property in a rosin by commerce and the arts.

I further found that if the same adsorbent, of same fineness, were conditioned to contain not less than 8% and not more than 9% moisture, were contacted at same temperature and for the same time with a 20% naphtha solution of the same E—F gum rosin employing four parts by weight of adsorbent to one part by weight of rosin, I could produce a decolorized gum rosin of equal color to the above or 5X and whose specific optical rotation had not decreased more than 1.5° from the original and whose tendency to crystallize from acetone or the other solvents for rosin (as well as from the molten state) was not materially or substantialy increased from the original rosin, also the product retained much of the pleasant flowery aroma characteristic of American gum rosins; thus is found a domestic supply of a useful rosin of a color grade higher than the color grade AAA of imported French rosin, which latter (when available) has always been highly expensive.

Several different lots of mineral consisting essentially of hydrous magnesium silicates from the same California deposits were subjected to these comparative experiments and the results above reported are typical of any lot and particularly was it found that the minimum quantity of moisture that any lot must contain in order to be certain that all aluminum silicate content was inactivated as isomerization agents was 8% of the dry weight of the material, also no lot required more than 9% of moisture to accomplish the same effect. An analysis of a natural deposit of essentially hydrous magnesium silicates for aluminum content ($Al_2O_3$), furnishes little trustworthy information from which to predict the minimum amount of moisture that the material must contain to operate as a desirable decolorizing agent upon gum rosin in naphtha solutions. This is easy of understanding since the silicates present in a natural deposit are probably several and may occur in varied ratios, also and no doubt some $Al_2O_3$ as such is commingled. I have found that the simplest way to determine the correct amount of moisture that an "unknown" deposit requires is to thoroughly wet a representative sample with water and then submerge it in the specification naphtha and while being well agitated, boil off the excess water; and when, at normal atmospheric pressure, a temperature of 88° C., has been reached connect the container to a condenser and raise the temperature of the naphtha covered sample to 100° C., collect and measure the water that distills off. This volume will represent the correct amount of moisture that that particular lot of a deposit of naturally occurring essentially hydrous magnesium silicates need contain to operate successfully as a decolorizing agent, without operating likewise as an isomerization agent, with naphtha solutions of gum rosins.

It is to be noted that the aluminum silicate so wetted seemingly does not have any isomerizing action on the rosin acids of gum rosin, but also seemingly does not perform any decolorizing action on the dissolved gum rosin. The water so taken up causes this aluminum silicate to be inert. Since many samples of mineral hydrous magnesium silicate (and I believe all such mineral) contain some aluminum silicate, I recommend that the said mineral be "moisture-conditioned" as described above, before use in the process.

From the foregoing recitations and reports on findings of my experimental work, it will be seen that I have invented a process by which gum rosin can be commercially decolorized, with rewards amply commensurate with results obtained; capable of producing degrees of decolorization of a gum rosin for example, E—F or lower grade to a product that may be arbitrarily described as 5X color grade without materially or substantially otherwise affecting the ratio and chemical and physical constitution of the resin acids of the rosin, and especially without materially or substantially lowering their specific optical rotation (or increasing the tendency towards crystallization, within themselves or from solutions).

It is to be understood that I do not restrict my discovery to any certain color grade of gum rosin as the object for decolorization or limit myself to any certain strength of naphtha solution of rosin (which may be 5% to 50%) or any certain kind of petroleum naphtha, though later I describe my preferred quality of naphtha. I do not intend that my discovery be restricted to any special deposit of a naturally occurring essentially hydrous magnesium silicate nor the fineness of the granular product employed or the minimum quantity of moisture that the material must contain other than sufficient to prevent the aluminum silicates of the material from materially and substantially increasing the crystallizability of the decolorized rosin. The time of contacting also may be varied between wide limits.

The preferred solvent to be used is a water clear, sulphur free, straight run petroleum fraction, containing no cracked distillates, of initial boiling point not lower than 100° C., and with an end or dry point not higher than 150° C., A. P. I., hereinafter referred to simply as "naphtha." But instead of the 100—150° cut, I can use somewhat different fractions, e. g., 110 to 150°, or 105—140°, etc. Such cuts will be included hereinafter under the term "naphtha."

For more completely explaining the invention and as a specific example (to the details of which the invention is not restricted), I give the following example:

In the practice of my invention I first suitably purify and moisture-condition a natural mineral which is essentially hydrous magnesium silicate, hereinafter referred to as the adsorbent, as follows: The screened "run of mine" product as received, I jig wash with water at enough pressure and velocity or speed to violently agitate it and float off as much as possible of the commingled clays and fines (e. g., smaller than 80 mesh), then dry, as by a hot air blast, and riddle for size, retaining for use those sizes that are held on an 80 mesh screen, and which pass a 40 mesh screen; I then promptly charge this dried, classified material into properly designed, vertical, cylindrical tanks closed and pipe-connected in a battery to operate in series. These tanks will hereinafter be called towers. I fill the towers with naphtha, thus preventing excessive heating and undue pressure when next I treat the adsorbent with a water diluted alcohol in the moisture-conditioning operation; in order to get the correct amount of moisture distributed throughout the whole of the adsorbent in the tower. I then slowly pump into the tower, through the bottom, 95% ethyl alcohol to displace the naphtha and when the effluent indicates the naphtha has been displaced (which may be about 40 minutes) I connect the outlet of the tower to a separate tank for the discharge of said alcohol, to the outlet of which tank I next connect the suction of the pump and disconnect the suction of the pump from the 95% alcohol supply, I thus circulate this quantity of alcohol through the adsorbent in the tower, pumping at the same rate until I have circulated this alcohol to the equivalent of two or three times the amount that was required to displace the naphtha. From the beginning of the pumping of the 95% alcohol until the naphtha is displaced, say a time of 40 minutes and then for an additional 80 to 120 minutes, I circulate this volume of alcohol and at the beginning of the pumping of the 95% alcohol into the tower and throughout the period of circulating time, except the initial 40 minutes required to displace the naphtha from said tower, I concomitantly spray inject, by aid of an apportioning pump, the exact weight of water, into the alcohol pump suction, as represents 8% by weight of the adsorbent in the tower. This operation will furnish the relatively dry adsorbent with a slight excess of moisture over the exact amount required to properly wet the aluminum silicate present, as the adsorbent will after hot air blast drying and during the sorting for size and charging, adsorb moisture from the surrounding air. When the operation of deliberately wetting the adsorbent with water diluted 95% alcohol is completed, the pump suction is disconnected from the alcohol circulating tank and connected to the specification naphtha tanks, and then heated naphtha is pumped into the tower to purge the superfluous or interstitial and absorbed alcohol off the adsorbent and from the tower. When discharge from the tower indicates naphtha, another change of delivery from tower is made into a hot naphtha circulating tank to the outlet of which tank, to which the pump suction is next connected and the line from naphtha storage tank is shut, the purging and circulating naphtha is heated before entering the tower to a temperature of 88° C., plus that additional temperature required to offset the depression to boiling by the pressure and weight of the liquid in the tower. This circulation of naphtha held at 88° C. plus, is maintained, make up naphtha being added as needed, until the outflow from the tower reaches exactly 88° C., when all the alcohol, and the amount of water in excess of the amount required to wet the aluminum silicates present in the adsorbent, will have left the tower. The tower should be vented through a water cooled condenser and thence to the atmosphere or to an atmospheric pressure equalized, vapor collecting system, the liquid effluent or circulating hot naphtha discharging into the hot naphtha circulating tank; at the beginning of the pumping of the hot naphtha and when first vapors and hot naphtha begin to flow from the tower, the temperature of boiling effluent will be about 65° C., and this will rise throughout the pump circulation as the adsorbed alcohol and water diminish and when the temperature of the effluent has reached 85° C., all the alcohol will have been dispelled from the tower and when 88° C., have been reached all the water in excess of the amount required to sufficiently wet and inactivate the aluminum silicates present in the adsorbent will likewise have left the tower.

Quite a pronounced raising of the temperature of the circulating naphtha (above that temperature at which a free admixture of naphtha and water boils) is necessary to dislodge any of the water adsorbed by the aluminum silicates of the adsorbent, clearly differentiating the greater adsorbing power of the aluminum silicates of the adsorbent over the magnesium silicates of same.

Just what chemical or physical-chemical or physical reactions take place in the wetting of the aluminum silicate content of the magnesium silicate mineral, I am not prepared to explain scientifically, but the aluminum silicate will be found to have taken up and held to itself, such an amount of water as is necessary for rendering the aluminum silicate inactive in two respects. Namely (a) this aluminum silicate so treated, will no longer act on the gum rosin to lower its dextro-rotatory power, and (b) this aluminum silicate seemingly is no longer active to adsorb color bodies from the gum rosin solution. These negative properties do not interfere with the color adsorbing action of the magnesium silicate content of the mineral. I term the action of the water in moisture conditioning of the aluminum silicate as an "aquation" thereof. This term "aquation" is intended to cover wetting the aluminum silicate with sufficient water to render it inert and incapable of increasing the crystallizing properties of the gum rosin.

The above method of moisture-conditioning the adsorbent material, is given as the preferred method. I may state that the wetting of the granular adsorbent material with alcohol (of the water content stated) generates great heat and would cause excessive pressure if not explosion, in a closed container. Accordingly the dried adsorbent material is first submerged in naphtha which it so slightly adsorbs as causes only a small temperature rise and then the water diluted 95% ethyl alcohol, is sent into the container or tower which because of the relatively greater adsorption of the diluted alcohol by the adsorbent, the naphtha is displaced from it and the added water or that amount in excess of 5% that the alcohol contains is still more preferably adsorbed than is the alcohol and so the adsorbent can be wetted with water, in controlled amount, without danger.

The decolorization of gum rosin, to the desired light color will now be described, using, by way of illustration the treatment of an E—F grade, gum rosin. The parts are by weight, except as otherwise stated.

A 20% solution of gum rosin in specification naphtha is made, preferably by agitation, preferably at 60–80° C. This solution is then cooled, by showering it with water, to about 30° C., or cooler. Then all bodies insoluble in the naphtha (including a rather deeply colored material) will settle out from the solution by defecation. The settled out material is removed, leaving the solution clarified.

If the rosin to be treated contains iron, this can be eliminated by a treatment with sulphuric acid solution.

The solution can be treated, with sulphuric acid of 0.5% to 10% strength, preferably 1% to 5% strength, the temperature of treatment and time of treatment depending on the concentration of the acid. If the acid is 5% strength, a volume of the dilute acid about equal to the volume of the rosin solution can be well agitated together with the rosin solution, at 65–70° C., for not over 10 minutes, then the acid solution (which will have combined with the iron originally present in the rosin) is settled out and drawn off, and the rosin solution washed with several changes of water (e. g., cold or tap water) until entirely free from sulphuric acid. If sulphuric acid solution stronger than 5% is to be used, e. g., 10% strength, the temperature preferably is lower, e. g., 30–35° C., and the time of contact is best not over 5 minutes. If a more dilute sulphuric acid is used, e. g., 2.5% strength, the temperature can be higher, say 80–85° C., and the time of contact may be 15–20 minutes.

With these times, concentrations and temperatures, the gum rosin is not materially injured, i. e., its tendency to crystallize is not substantially increased, which is the equivalent of saying that its dextro-rotatory power is not substantially decreased.

If the rosin does not contain combined iron, the sulphuric acid treatment is not needed, and would be omitted. After the acid treatment (if used) the solution is preferably again cooled to 30° C., or below.

This solution of gum rosin, at a temperature not higher than 30° C., is then percolated through three or more towers (containing the granular adsorbent) to storage. The number of towers employed depends upon the extent of decolorization wanted, and the degree of saturation of the adsorbent with color bodies, that is desired; employing two and three towers and a prescribed rate of flow to effect contact and time of contact ratios of, one part by weight rosin to one part by weight adsorbent for three hours, will produce a rosin of X grade. Using five or six towers or more at a rate of flow to effect contact and time ratios of, one part by weight of rosin to four parts by weight of adsorbent for three hours, will produce a gum rosin of 5X grade.

It will be understood that (after starting the process) the rosin solution flows first through the tower of the battery which has been longest in use, thence on and finally through the last tower to be introduced into the circuit.

When it is found that the adsorbent of a tower is spent or sufficiently saturated with color bodies, this tower receives a naphtha wash to flood the rosin solution into the next tower in the decolorizing battery; and an additional tower, containing fresh or "color body free" adsorbent is added as the last tower of the battery. When the outflow of rosin solution from the spent tower indicates displacement is accomplished, the supply of naphtha to this tower is stopped and the tower disconnected from the battery and "set up" for revivification. This latter step will be described below.

The rosin solution after passing through the series of decolorizing towers of the battery is taken from storage and the rosin rapidly separated from the naphtha by a steam distillation, preferably under at least 20 inches of mercury vacuum and at a temperature not in excess of 150 degrees C., the finished rosin will then be found to be X or 5X grade for color, as the case of treatment has been, brilliant and crystal clear in appearance, of satisfactory melting point, and retaining much of its pleasant, flowery aroma and having a composition of resin acids substantially the same as and in the substantially same ratio as the original gum rosin, and with a specific optical rotation and tendency towards crystallization, within itself or from its solutions, materially and substantially the same as the original gum rosin.

The tower containing the spent adsorbent is revivified by pumping into it, 95% ethyl alcohol, heated to 50-60° C., the alcohol will flood out the interstitial and adsorbed naphtha which is collected for further use; and by virtue of the adsorbent's decided preference for alcohol over naphtha, will the alcohol displace any and all naphtha on the surface of the granules of adsorbent; since alcohol is a complete solvent for all the color bodies of gum rosin and preferentially more adsorbed by the adsorbent than either the color bodies or the naphtha, the adsorbent will take upon its surface, the alcohol, to a point of satisfaction or neutralization of its peculiar affinity which phenomenon is called "adsorptive power"; and the color bodies and naphtha, as displaced will dissolve and pass into the surrounding alcohol, becoming a solution. The pumping of hot alcohol is continued, slowly, through the tower for a period which may be about four hours or until the displaced and dissolved color bodies and adsorbed naphtha are moved out of the top into a collector tank, usually requiring 2–3 volumes of alcohol, for each volume of the adsorbent in the tower.

Then naphtha preheated to 88 plus degrees C., is pumped into the tower until effluent from the tower indicates the presence of quantities of naphtha, when discharge is turned into naphtha circulating tank and pump suction changed from clean naphtha tank to circulating naphtha tank and with tower connection to condenser opened, hot naphtha circulation is maintained at the above inlet temperature until the outlet temperature has reached 85° C., when all the alcohol will have been expelled from the tower and contents.

The adsorbent in the tower has now been regenerated. The tower is preferably now cooled by circulating cold naphtha through it. This tower is now fit to be returned to the decolorizing battery.

Thus is a cycle of the decolorizing process completed.

It will be understood that this invention does not restrict or limit itself to ethyl alcohol as a regenerative solvent; any complete solvent for the color bodies of gum rosin that is miscible with water and naphtha, will under their certain set of conditions accomplish this, as methyl, propyl or other alcohols and acetone. Denatured alcohol, e. g., Formula 13, is very suitable, and cheap. These other alcohols can also be used in moisture-conditioning the mineral adsorbent.

It is to be understood that other grades of gum rosin instead of E—F can be used, precisely as in the above example, and as the rosin started with is darker or lighter, greater or less contact with the adsorbing mineral will be needed to give the same final grades. It also is to be noted that the process can be used to give grades of gum rosin lighter or darker than grade X.

If at any time and for any cause in the continuous operation of this process, the adsorbent of any tower shows by test (polarimeter readings) of the input and output gum rosin solutions, that the adsorbent is acting to isomerize the rosin passing through it to such an extent that is materially and substantially damaging to the usefulness of the rosin in commerce and the arts by so increasing its tendency to crystallization, then that certain tower should be cut out of the battery, cleaned of its rosin solution, revivified by freeing the adsorbent of its color bodies, all as above explained as treatment for a tower that is spent, and sufficient water added to alcohol to correct the deficiency and the operation be guided by the same set of conditions prescribed for "moisture conditioning" operation.

Now, having recited my findings, revealed my discovery and described my process, I claim:

A process which comprises wetting the residual aluminum silicate still contained in a mineral hydrous magnesium silicate from which a substantial part of the originally contained aluminum silicate has been removed, by contacting same with a volatile alcohol containing a small percentage of water, while said mineral is in a granular to lumpy condition, separating the residual alcohol from said mineral and contacting said mineral with petroleum naphtha at a temperature above the normal boiling point of said alcohol but below 100° C., to leave all of the aluminum silicate content thereof wetted with water, in which condition it is substantially free from isomerizing action on the resin acids of gum rosin, contacting a solution of gum rosin containing color bodies, in an inert solvent, with a substantially stationary mass of said so treated mineral in a granular state, whereby the color bodies present in said solution are, to a large extent, adsorbed in said mineral, drawing off the gum rosin solution from said mineral containing adsorbed color bodies, and separating the solvent and the gum rosin from each other at a temperature too low to substantially injure the rosin, said granular adsorbent being of such particle size as to be retained on an 80 mesh screen.

WILLIAM BURNS LOGAN.

REFERENCES CITED

The following references are of record in the file of this patent:

UNITED STATES PATENTS

| Number | Name | Date |
| --- | --- | --- |
| 1,598,254 | Prutzman | Aug. 31, 1926 |
| 1,643,276 | Logan | Sept. 20, 1927 |
| 1,794,539 | Palmer | Mar. 31, 1931 |
| 2,163,526 | Caldwell | June 20, 1939 |
| 2,163,527 | Caldwell | June 20, 1939 |
| 2,181,791 | Price (1) | Nov. 28, 1939 |
| 2,281,078 | Price (2) | Apr. 28, 1942 |
| 2,340,672 | Lister | Feb. 1, 1944 |

OTHER REFERENCES

Soane, The Chemistry of Rosin and Rosin Oil, from Jour. Oil and Colour. Chem. Assoc., vol. 5, pages 320–341 (1922).